United States Patent
Rindner et al.

[15] 3,686,542
[45] Aug. 22, 1972

[54] SEMICONDUCTOR TRANSDUCER DEVICE

[72] Inventors: Wilhelm Rindner, Lexington; Americo Iannini, Marlboro; Andre Garfein, Brighton, all of Mass.

[73] Assignee: The United States of America as represented by the Administrator of the National Aeronautics and Space Administration

[22] Filed: Nov. 23, 1970

[21] Appl. No.: 91,642

Related U.S. Application Data

[62] Division of Ser. No. 738,315, June 19, 1968, Pat. No. 3,566,459.

[52] U.S. Cl.........317/235 R, 317/235 M, 317/234 D, 317/234 G, 29/588

[51] Int. Cl...........................H01l 11/00, H01l 15/00

[58] Field of Search........317/234 D, 234 G, 234 M, 235 M; 29/588, 589

[56] References Cited

UNITED STATES PATENTS

| | | | |
|---|---|---|---|
| 2,946,935 | 7/1960 | Finn | 317/235 M |
| 3,107,277 | 10/1963 | Rogers | 317/235 M |
| 3,221,277 | 11/1965 | Hauer | 317/234 D |
| 3,295,085 | 12/1966 | Nelson | 317/234 M |
| 3,308,355 | 3/1967 | Davis et al. | 317/234 P |
| 3,512,054 | 5/1970 | Owada et al. | 317/235 M |
| 3,518,508 | 6/1970 | Yamashita et al. | 317/234 M |

FOREIGN PATENTS OR APPLICATIONS

| | | | |
|---|---|---|---|
| 1,453,546 | 10/1966 | France | 317/234 M |

*Primary Examiner*—John W. Huckert
*Assistant Examiner*—Andrew J. James
*Attorney*—John R. Manning et al.

[57] ABSTRACT

According to the invention, there is disclosed a miniature electromechanical junction transducer, the operation of which is based on piezojunction effect. The mechanical imput coupling member, in the subject invention, as distinguished from the prior art, is formed in situ and is spread over the top of the mesa structure to form an exact duplicate of the mesa surface at the area of contact.

5 Claims, 4 Drawing Figures

WILHELM RINDNER
AMERICO A. IANNINI
ANDRE GARFEIN
INVENTOR(S)

BY Wayland H. Riggins
ATTORNEY

SEMICONDUCTOR TRANSDUCER DEVICE

CROSS-REFERENCE TO RELATED APPLICATIONS

The invention described herein is a division of application Ser. No. 738,315, filed June 19, 1968, now U.S. Pat. No. 3,566,459.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to electromechanical transducers and more particularly to the technique for mounting a stress coupling or stress transmitting member on a stress sensitive semiconductor device and the resultant device.

Much of the difficulty experienced by the prior art in developing and producing a piezojunction stress transducer, resides in the fact that the mechanical input is concentrated and applied to a relatively small area of the semiconductor device surface. For the most part, the desired stress concentration was accomplished by the use of a fine, hard stylus resting on the device surface or, as in one situation, by a needle-shaped semiconductor diode in contact with a hard flat surface.

In any of the approaches considered so far by the prior art, the operation of the device was based on the principle of providing contact between a semiconductor surface, be it flat or rounded, and a hard pre-shaped solid. Extensive experience has shown that this type of mechanical contact produces instabilities that may be traced to the fact that the stylus and the mesa surface, however well shaped, are bound to have minute irregularities, which may be micron or sub-micron size, produce corresponding uncontrollable and damaging stresses and deformations to the semiconductor and, therefore, device degradation. Also, it is extremely difficult, with such mechanical coupling, to avoid lateral displacement of the stylus, at the contact area, both during the operation of the device and more particularly, during the manufacture or the assembly of the device. Any such movement produces a "noisy" or even a defective device. In any event, in the approach used by the prior art, it is extremely difficult to have the two hard surfaces in uniform contact with each other.

To obviate the difficulties encountered by the prior art it is hereby proposed that a mesa structure be provided and that the stress coupling member be formed in situ in intimate contact with the top of the mesa surface. It is preferable that the stress coupling member be moldable during the manufacturing process yet be extremely hard in the completed device.

By utilizing epoxy, or other materials that are readily moldable during processing but are hard when used as the stress coupling member, and by molding the member in situ, we have found that the pressure across the surface of the mesa is uniform and that the device fabrication has been markedly simplified.

Another benefit derived from this procedure resides in the fact that the completed device is now virtually free of the damaging structural and alignment problems usually encountered in the prior art.

Further, since in our structure the pressure sensitive area of the transducer may be recessed, handling of the delicate structure is no longer a problem.

While the following recitation of the operation of our invention will be described in terms of a diode type device, it should be obvious to those skilled in the art that any semiconductor device having one or more P-N junctions, and one or more of which are pressure or stress sensitive mesa structures, may be appropriately utilized in our device by applying the stress coupling member to the mesa structure.

Further, since the stress transmitting or coupling member is firmly bonded to the top of the mesa surface, we are also able to detect negative pressures as well as positive pressures that may be applied to the stress coupling member without having to pre-stress the stress transmitting or coupling member.

It is, therefore, one object of the present invention to provide a miniature piezojunction, electromechanical transducer wherein the stress transmitting or coupling member is molded in situ.

Another object of the present invention is to provide a miniature piezojunction, electromechanical transducer wherein the pressure across the top of the mesa is essentially uniform.

Still another object of the present invention is to provide a miniature piezojunction, electromechanical transducer that is virtually free of the damage and alignment problems encountered in the prior art.

A further object of the present invention is to provide a miniature piezojunction, electromechanical transducer wherein the pressure sensitive area of the transducer is recessed, to facilitate the handling of the device.

A still further object of the present invention is to provide a miniature piezojunction, electromechanical transducer that is noted by its ease of manufacture and by its reliability of performance.

Yet a further object of the present invention is to provide a miniature piezojunction, electromechanical transducer capable of measuring negative pressures without having to be pre-stressed.

The features of our invention which we believe to be novel are set forth with particularity in the appended claims. Our invention itself, however, both as to its organization and method of operation, together with further objects and advantages, may be best understood by reference to the following accompanying drawings.

DESCRIPTION OF THE PREFERRED EMBODIMENTS

Figure 2:
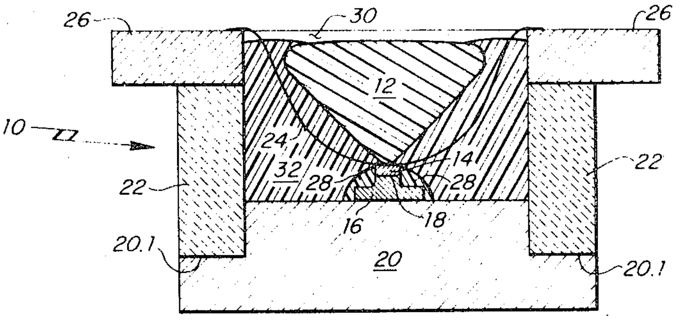
FIG. 2 is a sectional view of our transducer taken along lines 2 — 2 of FIG. 1.
Figure 1:
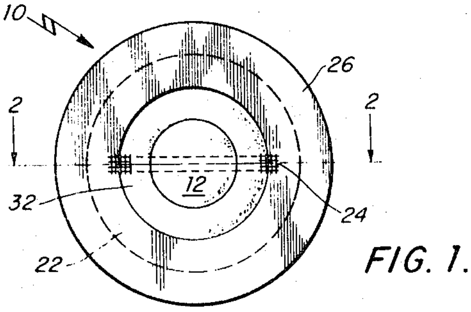
FIG. 1 is a plan view of our novel transducer.

Referring now to FIGS. 1 and 2, there is shown our novel transducer device 10 wherein stress coupling member 12 is in a recessed position and in contact with a semiconductor, stress sensitive device. A first region 14 which may be an N-type semiconductor material is mounted on a second region 16 of semiconductor material, which latter region would be doped with a P-type impurity, with the resulting interface 18 forming the required diode junction. We have found that either Germanium (Gc), Gallium Arsenide (GaAs) and Gallium Antimonide (GaSb) semiconductor junctions may be conveniently produced and utilized in our device, with good results. While we have shown regions 14 and 16 as being N- and P-type materials respectively, it should be obvious to those skilled in the art that our device might work equally well should region 14 be formed of P-type material and chip 16 formed of N-type material.

Chip 16, with its provided tunnel diode mesa portion is affixed to bottom diode contact 20 which provides one of the electrical connections to the device, so that our device may be utilized in a circuit. Bottom contact 20 is further provided with a shoulder portion 20.1 on which a circular ceramic support member 22 may be affixed. The combination of ceramic member 22 and bottom diode contact 20 forms a cavity 30 within which both the tunnel diode (14, 16 and 18), as well as the stress coupling element (12) is recessed. Contact strip 24 is provided to furnish a means of electrical connection between the top of mesa 14 and diode contact 26.

In the manufacture of our device, junction 18 is formed by appropriately combining P and N type materials, utilizing any of the well known methods. Ceramic ring 22 is bonded onto shoulder 20.1 of bottom diode contract 20, and top diode contact 26 is affixed to the uppermost portion of ring 22 to form cavity 30. The diode assembly (14, 16 and 18) is then cemented or soldered to or otherwise fixed, in good electrical contact, to bottom diode contact 20. Metallic contact strip 24 is then set into the device so as to extend between top diode contact 26 and the upper surface of mesa 14. Mesa 14 is then provided with an insulating plastic supporting structure 28 which maybe an epoxy, to firmly embed and fix its position on and with respect to chip 16. Thereafter cavity 30 is filled with an epoxy material 32.

Epoxy 32 is first placed into cavity 30 on bottom diode contact 20 in such a manner as to surround the outer perimeter of chip 16 and is built up along the sides of ceramic ring 22 until the desired form for stress coupling member 12 has been produced. It should be noted at this point that, in order to prevent loss of mechanical input signal at the junction, epoxy 32 should have, when fully set and cured, a modulus of elasticity longer than that of the diode and that of the stress coupling member.

Once epoxy 32 has set and formed into the desired shape, additional epoxy is placed into the mold to form stress coupling member 12. The epoxy used to form stress coupling member 12 must, when set, be much harder than epoxy 32. When so formed, stress coupling member 12 is in contact, at its apex end with the top surface of mesa portion 14. After an appropriate curing period for filler epoxy 32 and stress coupling member 12, the device is completed and ready for use.

Alternatively, member 12 may be formed so that the upper surface is extended to be in contact with diode contact 26, thereby sealing cavity 30. Under these circumstances, the device is capable responding to mechanical signals of frequencies ranging down to D.C.

Figures 3, 4:
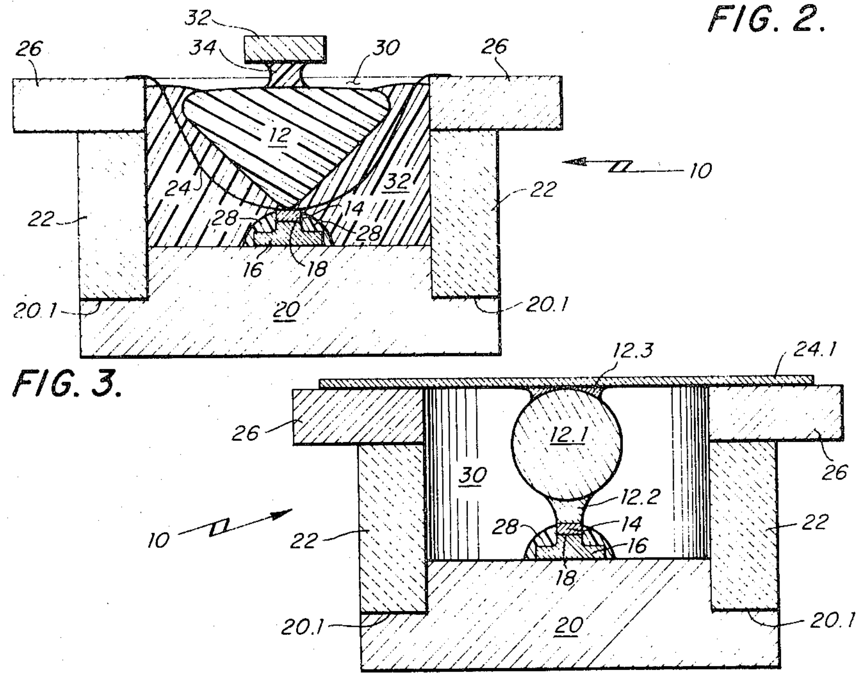
FIG. 3 is a sectional view of another embodiment of our invention.
FIG. 4 is a sectional view of still another embodiment of our novel transducer.

Referring now to FIG. 3, wherein elements similar to those shown in FIGS. 1 and 2 are similarly numbered, it will be seen that we are able to utilize the basic structure of our novel device as a small, sensitive accelerometer. This is realized by attaching a seismic mass, such as member 32, to the exposed portion of member 12 by means of coupler 34. This coupler 34 may take the form of an epoxy cement or any other suitable means for rigidly fixing seismic mass 32 to member 12. Member 32 acts as the seismic mass, which, upon acceleration, produces a force on the transducer.

Referring now to FIG. 4, there is shown still another embodiment of our invention wherein elements similar to those shown in FIGS. 1–3 are similarly numbered. In this embodiment, a premolded stress coupling member 12.1 is firmly affixed, by means of a cement or an epoxy, moldable interface 12.2 to the surface of the mesa structure. It should be here noted that in this embodiment, the epoxy filling (32, FIGS. 1, 2 and 3) is absent. Interface member 12.2 is formed after cavity 30 is provided with a removable, moldable material such as wax. In this situation, after the wax has been formed in the cavity, with a suitable configuration to form the interface member 12.2, the epoxy for the interface member 12.2 is introduced into the form and the wax removed. In this latter embodiment, if it is so desired, members 12.1 12.2 and 12.3 may be formed of an electrically conductive material,obviating the need for contact strip 24 of FIGS. 2 and 3. A conductive membrane 24.1 is stretched across cavity 30 and attached to diode contact 26. The center thereof in contact with or attached to the top or exposed surface of the premolded stress coupling member 12.1 by means of material 12.3.

While we have described what is presently considered the preferred embodiment of our invention, it will be obvious to those skilled in the art, that various other changes and modifications may be made therein without departing from the inventive concept and, it is therefore, aimed in the appended claims to cover all such changes and modifications as fall within the true spirit and scope of our invention.

What is claimed is:

1. A stress sensitive device, comprising:
   a semiconductor having a mesa region and a junction;
   a stress coupling member;
   a portion of said stress coupling member being molded in situ in engagement with and bonded to said mesa region;
   first and second electrically conductive contact members;
   a conductive element electrically connecting said first contact member to said mesa region;
   the opposite end of said semiconductor being in electrical contact with said second contact member;

a spacer member extending between said first and second contact members, said spacer member and said contact members forming a cavity;

said semiconductor and said stress coupling member being disposed within said cavity.

2. The invention as defined in claim 1 wherein said cavity is partially filled with an inert material, said inert material being in contact with a portion of said stress coupling member and said semiconductor to fix the position of said stress coupling member and said semiconductor, said inert material having a modulus of elasticity longer than that of said stress coupling member and said semiconductor.

3. The invention as defined in claim 1 wherein said stress coupling member comprises an apex portion, said apex portion being bonded to said mesa region.

4. The invention as defined in claim 1 wherein a seismic mass is affixed to said stress coupling member.

5. The invention as defined in claim 1 wherein said stress coupling member comprises a preformed electrically conductive mass portion, a thin electrically conductive coupling layer portion molded in situ as a coupling interface between said mesa region and said preformed mass portion.

* * * * *